(12) United States Patent
Lidster et al.

(10) Patent No.: US 7,070,826 B2
(45) Date of Patent: Jul. 4, 2006

(54) PROCESS AND FORMULATION FOR PRODUCING A MULTIPURPOSE, MULTI-FUNCTIONAL APPLE BASE

(75) Inventors: Perry David Lidster, Yarrow (CA); William Duncan Powrie, North Vancouver (CA); Patrick M. Chung, Coquitlam (CA)

(73) Assignee: Pacific Rim Marketing Limited, Vancouver (CA)

( * ) Notice: Subject to any disclaimer, the term of this patent is extended or adjusted under 35 U.S.C. 154(b) by 257 days.

(21) Appl. No.: 10/618,669

(22) Filed: Jul. 15, 2003

(65) Prior Publication Data

US 2005/0013913 A1    Jan. 20, 2005

(51) Int. Cl.
*A23L 1/212*    (2006.01)
(52) U.S. Cl. ............... 426/615; 426/518; 426/519; 426/520
(58) Field of Classification Search ............... 426/615, 426/519, 520, 518
See application file for complete search history.

(56) References Cited

U.S. PATENT DOCUMENTS 4,368,211 A * 1/1983 Blake et al. ............... 426/564
6,383,546 B1   5/2002 Powrie et al.
2001/0053404 A1 * 12/2001 Powrie et al. ............... 426/599

* cited by examiner

*Primary Examiner*—Helen Pratt
(74) *Attorney, Agent, or Firm*—Oyen Wiggs Green & Mutala LLP

(57) ABSTRACT

This invention pertains to the process and formulation for the production of a multipurpose base consisting of mechanically-fractured apple cells and intact single apple cells and optionally gum stabilizers. The multipurpose base possesses desirable functional properties of smoothness, creaminess, viscosity enhancement, changeability and particulate carrier as well as nutraceutical and nutritional values. The multipurpose base is to be used as an ingredient for the preparation of smoothies, fruit salsa, fruit toppings, fruit desserts, soups and salad dressings. The sequencial process operations involve the mechanical impaction and screening of thermally-treated apple pieces to form a cellular aggregated mince, the comminution of the mince to produce a mash of intact single cells, homogenization of the mash to form a slurry consisting of released protoplasmic microparticles, size-specific cell-wall fragments and solubilized pectin, and finally the intermixing of the slurry dispersion and apple mash to create a multipurpose base with or without added gum stabilizers.

14 Claims, No Drawings

PROCESS AND FORMULATION FOR PRODUCING A MULTIPURPOSE, MULTI-FUNCTIONAL APPLE BASE

FIELD OF THE INVENTION

The present invention relates to a novel multipurpose apple base for use as an ingredient for preparing non-setting beverages, fruit salsa, fruit toppings, fruit desserts, soups and salad dressings.

BACKGROUND OF THE INVENTION

Studies have shown that diets with generous amounts of fruits and vegetables are associated with a low risk of major chronic diseases including cancer and cardiovascular disorders. Dietary guidelines prepared by government organizations recommend five to ten servings of fruits and vegetables per day for providing health-promoting nutrients. The polyphenolic compounds in fruits and vegetables have been connected to the health benefits. These polyphenolic compounds may act as antioxidants, which inhibit the oxygen free radicals and promotion of cancer cells, and which inhibit the oxidation of low-density lipoprotein cholesterol. To be effective as an antioxidant, the polyphenolic compounds must not be oxidized through the enzymic browning reactions in the fruits and vegetables and must be accessible during passage through the gastrointestinal tract.

Apples contain a wide variety of polyphenolic compounds as well as soluble and insoluble fiber. With these attributes, apples should be included in the human diet as an important contributor to human health. The moderate cost, year-round availability, pleasant flavor and color, acceptable balance of sourness to sweetness and the absence of stringy, fibrous vascular tissue are additional benefits of the apple.

If a suitably-processed multipurpose apple base were available as a multi-functional ingredient, a wide variety of food products such as smoothies, fruit sauces, fruit desserts, salsa, soups and salad dressings could be prepared. The multipurpose, multi-functional base would be a viscous matrix within which fruit purees, yogurt, soy milk and other protein dispersions would be incorporated and the resulting mixtures could be used as sauces for the preparation of the above-mentioned food products or could be diluted with juices to create fruit beverages. The wide variety of appealing food products prepared with the apple base would possess the health benefits of the apple.

The goal of this invention was to develop a multipurpose apple base which would have multi-functional properties to be carried through to the resulting mixtures. The required multi-functional properties of the apple base are to be:

1. smooth, non-grainy, non-gummy mouth feel;
2. creamy, viscous texture;
3. compatibility with added fruit purees and protein-containing products;
4. uniform dispersion of hydrated apple cellular particles without syneresis during prolonged storage of the base;
5. glossiness;
6. essentially colorless;
7. clingability and adhesiveness to fruit and vegetable pieces;
8. non-oxidized, polyphenolic compounds;
9. readily available polyphenolic compounds in the human digestive system;
10. solubilized protopectin (pectin).

The inventors found that when an apple mash consisting of intact single cells was combined with a homogenate composed of fractured single apple cells, an apple base with the above mentioned functional properties was created. This base can be considered as a dispersion with the continuous phase having soluble sugars, pectin, polyphenolic compounds, vitamins and minerals, and with the dispersed phase consisting of size-specific cell wall fragments, protoplasmic microparticles and intact single cells. The inventors also found that the viscosity of the base could be increased by the addition of a water-dispersible gum such as pectin or guar gum without effecting the multi-functional properties.

The requisite apple mash is produced by a sequence of process operations including the steaming of cut apple pieces and the disjoining of the intact cells by moderate mechanical impaction and screening. In addition to the production of intact single cells, protopectin is solubilized as colloidal pectin. During the high-temperature steaming of the apple pieces, the cellular protoplasts are gelatinized to render the cells as elastic bodies which are resistant to break down by the moderate mechanical impaction and screening operations. Also, the steaming of the apple pieces brings about the disruption of the intercellular adhesion in the middle lamellae for the release of individual intact cells.

The steaming of apple pieces brings about the inactivation of the polyphenol oxidase with the benefit of preserving the naturally-occurring, polyphenolic compounds in the unoxidized form and of retaining the colorless or near colorless state of the cells.

When the mash with intact, single cells is subjected to high pressure homogenization, the cell walls break and are fragmented, and the gelatinized protoplasts become microparticularized. The homogenate is a slurry of small, size-specific cell wall fragments and protoplasmic microparticles as the dispersed phase in a continuous phase containing soluble constituents. Accessible unoxidized polyphenolic compounds are also present in the homogenate.

The homogenate has the sensory attributes of smoothness, non-graininess, non-gumminess, and stabilization of added protein nutrients, but lacks creaminess and viscous body. The inventors discovered that when 5 to 50% of the single-cell mash was added to the homogenate to form an apple base, creaminess and a more viscous body can be experienced by sensory analysis. Further, with the addition of mash to the homogenate, the apple base becomes opaque, the level increasing as the mash content rises. It is of interest to note that the slight graininess of apple mash does not carry over to the apple base because of the interaction of the particulates of the homogenate with the grainy cellular aggregates of the mash to form smoother, hydrated surfaces.

Two of the inventors herein have been involved in the development of a universal fruit base which is now the subject of U.S. Pat. No. 6,383,546 B1, granted May 7, 2002, of which the contents thereof, as far as they are relevant to the subject invention, are incorporated herein by reference.

SUMMARY OF THE INVENTION

This invention pertains to the process and formulation for the production of a multipurpose, multi-functional apple base consisting of mechanically-fractured apple cells and intact, single cells and optionally gum stabilizers. The multipurpose apple base possesses desirable functional properties of smoothness, non-gumminess, creaminess, compatibility with added fruit purees and protein-containing products, clingability and adhesiveness to fruit and vegetable pieces and chunks, viscosity enhancement, non-settling and non-syneresis matrix, and nutritional and nutraceutical values. With these valuable functional attributes, the multipurpose apple base can be used as a functional carry-through ingredient for the preparation of smoothies, fruit salsa, fruit toppings, fruit desserts, soups and salad dressings (fat free or other) which can be achieved with the incorporation of fruit purees, fruit and vegetable pieces and chunks, yogurt, soy milk, other protein dispersions and fruit and vegetable juices.

This invention is directed to the process and formulation of producing a multipurpose, multi-functional apple base with the following sequential steps:
  (a) washing and sanitizing the apples to inactivate residual microorganisms;
  (b) cutting the apples into suitable-sized pieces;
  (c) steaming the apple pieces to inactivate enzymes, to gelatinize the protoplasts, to breakdown the intercellular protopectin and inactivate microorganisms;
  (d) macerating and screening the steamed apple pieces to produce a mince and to eliminate unwanted skin and core components;
  (e) comminuting the apple mince to form a mash with predominantly intact single cells;
  (f) homogenization of a portion of the mash to fracture the intact, single cells for the production of protoplasmic microparticles, solubilized pectin and size-specific cell wall fragments; and
  (g) addition of 5 to 80% weight mash to the fractured cell homogenate to produce the multipurpose, multi-functional apple base.

The present invention involves process operations and formulation to produce a processed multipurpose apple base retaining the fruit solids of the fresh apple. The specific apple solids in the base contribute to the multi-functional features and to the nutritional and nutraceutical values. The multipurpose apple base may be used as such without any additives for the preparation of a variety of food products. Optionally, gum stabilizers may be added to increase the viscosity of the apple base to enhance the stability of some food products to be stored for prolonged periods. The addition of gum stabilizes, such as pectin and guar gum, do not alter the special multi-functional features of the base. The pectin can be obtained upstream from discarded components or from external sources. Optionally, ascorbic acid may be added to the apple base to increase the vitamin C content and to keep the polyphenolic compounds in the reduced state.

The washed and sanitized apple pieces can be steamed at temperatures between 100 and 110° C. to gelatinize the protoplasts, to inactivate the enzymes and to solubilize the protopectin in the middle lamellae to water-dispersible pectin.

The steamed apple pieces can be subjected to impaction in a finisher/pulper to produce an apple mince with cellular aggregates and without core, seed and skin components which are removed as waste. The screen of the finisher/pulper should preferably have an opening of 0.05 to 0.13 inches (1.5 to 3.35 mm) and a paddle speed of at least 1000 rpm.

The apple mince can be passed through a comminutor with specific screens to produce an apple mash with a predominance of intact single cells by disjoining the aggregated cells upon mechanical impaction. The screens of the comminutor should preferably be between 0.033 and 0.093 inches (0.85 and 2.36 mm).

The apple mash can be subjected to homogenization at suitable pressures to bring about the fracture of the intact, single cells to produce a slurry with protoplasmic microparticles, size-specific cell wall fragments and solubilized pectin. Homogenization pressures can be between 1000 and 5000 psig, and preferably 2000 to 3500 psig.

A measured amount of apple mash (5 to 80% weight, and preferably 5 to 50% weight) can be added to the homogenized slurry to build-in more functionality, namely creaminess, viscosity increase, opacity and apple stability for the production of multi-functional, multipurpose apple base.

DETAILED DESCRIPTION OF SPECIFIC EMBODIMENTS OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification is to be regarded in an illustrative, rather than a restrictive, sense.

Generous amounts of fruits and vegetables in the human diet have been related to the low risk of developing major chronic diseases, particularly cancer and heart disease. The polyphenolic compounds in fruits and vegetables have been connected to the health benefits. Fresh apples possess many types of unoxidized polyphenolic compounds, which have antioxidant activity. During the processing of the fresh apples, the polyphenolic compounds must not be oxidized and must become accessible to the body. Nutritionists recommend that whole fruit should be included in the diet particularly since fruit juices may include only a portion of the total nutrients of the respective whole fruits. During the production of apple juice, only a portion of the total polyphenolic compounds in fresh apples is expressed and within a period of one hour, these polyphenolic compounds are oxidized through the polyphenol oxidase activity in the juice.

The goal of this invention was to develop a process and formulation to preserve the nutritional and nutraceutical values of whole apples and further to build-in multi-functional properties to an apple base to be used as an ingredient for the preparation of a variety of food products.

The apple base contains essentially all of the polyphenolic compounds of the process-designated apples in the unoxidized form. The present invention includes heat inactivation of the polyphenol oxidase and other oxidases in the fresh apple with the benefit of inhibiting the oxidation of nutrients and nutraceuticals for the contribution to human health. The homogenization operation step in the invention for the fracturing of the single apple cells can bring about exposure of the nutrients and nutraceuticals.

The multi-functional features of the apple base can be extended to a wide variety of food products and thus the apple base can be designated as a multipurpose ingredient. The multi-functionality of the apple base can be attributed to the specific sizes, shapes and surface properties of the microparticles of the cell wall fragments and of intact, single cells, the chemical properties of the base components and the interaction of the components with each other.

The multipurpose, multi-functional apple base is a viscous matrix within which fruit purees, yogurt, soy milk and other protein dispersions would be incorporated and the resulting mixtures could be used as sauces for the preparation of fruit salsa, fruit desserts, fruit toppings, soups and fat-free salad dressings or could be mixed with fruit juices and protein-containing products to create smoothie beverages.

The success of these food products in the marketplace is dependent on satisfying the desires and expectations of consumers. The multi-functional features of the apple base have been built-in through specific process operations and formulation to elicit desirable consumer sensations. The apple base-containing sauces are to be refreshing, creamy, smooth, viscous and color-pleasant. A refreshing sauce is perceived as having rapid-response taste sensations (balanced sensations of sweetness, sourness and bitterness), lingering rich, fruity flavor and clearance from the oral cavity prior to the next entry into the mouth. The texture sensations of creaminess, smoothness and thickness are governed by the size, shape, number and interaction of dispersed particles in the continuous phase of the sauce and by the chemical characteristics of the components.

The apple base, as a major ingredient of the sauces, imparts these desirable functional features. With respect to the smoothie beverages, creaminess, smoothness, rich fruit flavor, balanced taste sensations, pleasant color and nutritional value are the expected valued features which can be attributed in part to the apple base as one of the major ingredients.

Creaminess is perceived when the globular, intact, single cells of the added mash to the apple base move easily and slowly along the tongue without appreciable adherence. When the amount of added mash to the homogenate is increased, the degree of creaminess increases.

Smoothness of the apple base can be attributed to the small, high hydrated microparticles, hydrated, curved cell wall fragments, intact single cells and naturally-occurring pectin.

The thickness of the apple base is dependent on the water-binding capability of the pectin, microparticles, and intact, single cells and on the three-dimensional network of cell wall fragments. Optionally, gum stabilizers, such as apple and citrus pectin and guar gum, may be added to the apple base to increase the viscosity without significantly diminishing the built-in multi-functional features.

The present invention in a certain embodiment provides a process and formulation for producing a multipurpose, multi-functional apple base consisting of mechanically fractured apple cells and intact single apple cells, and optionally gum stabilizers. The apple base possesses desirable functional features of smoothness, creaminess, viscosity enhancement, clingability and particulate carrier as well as nutritional and nutraceutical values. The multipurpose apple base is to be used as an ingredient for the preparation of beverages, fruit salsa, fruit toppings, fruit desserts, soups and fat-free salad dressings.

This invention in one embodiment pertains to a high temperature steaming of cut apple pieces which may be prepared from unpeeled, uncored apples, or from peeled apples, or from cored apples or from peeled, cored apples. The apples are cut into pieces of suitable size in order to attain the targeted high temperature in a short time period during steaming. The apple pieces are subjected to live culinary steam in a closed system to bring the temperature of the pieces to at least 90° C. in order to break down protopectin in the middle lamellae and thus disrupt the intercellular adhesion, inactivate polyphenol oxidase, gelatinize the protoplasts and plasticize the cell walls. A steam temperature of 100 to 110° C. is suitable for softening the apple pieces and for accomplishing the above-mentioned changes. The preferred steam temperature is between 105 and 110° C. with the benefit of rapid temperature come-up time of the apple pieces, shorter steaming time and less water condensate.

The next process step is the break down of the steamed apple pieces in a finisher/pulper to produce a mince and to remove skin and core pieces, and seeds as waste. The screen of the finisher/pulper should have openings from 0.05 to 0.13 inches (1.5 to 3.35 mm) and the paddle speed should be at least 1000 rpm. As the screen opening size increases from 0.05 to 0.13 inches (1.5 to 3.35 mm) the flow-through time of the mash through the screen decreases and the size and mount of multicellular clumps in resulting mince increases. The objective of this process operation is to maximize mince yield, to reduce core and skin particle inclusions to an acceptable level and to produce a mash with a smooth texture with a low level of graininess.

The subsequent impaction operation according to the invention involves the particle size reduction of cellular aggregates of mince by a comminutor to maximize the amount of single, intact cells in the resulting mash. In this process operation, the mince with a grainy texture is converted to a mash with a smooth body. The comminutor with impact-edged blades should have screens with openings of between about 0.033 to 0.093 inches (0.85 to 2.36 mm) to produce a mash with a smooth texture. The inventors have found that the apple mash passing through the 0.033 inch (0.85 mm) screen was very smooth and had a very slight grainy texture, while the 0.093 inch (2.36 mm) mash was smooth but had a slight grainy texture. The slight graininess of the mash is caused by the presence of a relatively small amount of interconnected multicells with vascular tissue as aggregates which are resistant to comminutor impactions.

With the conversion of the mince to the mash, the viscosity drops to the extent that the mash is pourable. This lower viscous flow and the predominance of very small single, intact cells is advantageous for the unrestricted passage of the mash through the homogenizer without any large particle plugging at the homogenizer valve.

The purpose of the homogenization of apple mash is to produce small, highly hydrated, fractured cell particles which are resistant to sedimentation and provide adsorptive surfaces for added ingredients, and which are responsible for a very smooth, viscous, non-gummy, non-grainy texture.

The inventors have found that the level of fracture and breakage of intact cells during homogenization is dependent on the homogenizer pressure. As the pressure is increased to 3500 psig, the breakdown of intact cells increases and the sizes of fractured cell particles decreases. When water suspensions of 100 gram samples of mash and homogenates from the mash are passed through a 5-tier Tyler sieve system, the following particle size distributions were determined and are presented in Table 1.

TABLE 1

| Sieve in Mesh | Screen Openings | Wet Weight in Grams Homogenizer Pressure | | |
|---|---|---|---|---|
| | | Mash | 500 psig | 2000 psig | 3500 psig |
| 32 | 0.5 mm | 3.9 | 1.3 | 1.4 | 1 |
| 48 | 0.2 mm | 11.8 | 5.7 | 1.1 | 1.2 |
| 60 | 250 um | 21.9 | 26.5 | 6.6 | 2.9 |
| 80 | 177 um | 9.1 | 6.5 | 17.1 | 16.1 |
| 120 | 125 um | 2.5 | 1.1 | 4.5 | 6.9 |
| Total Weight | | 49.2 | 41.1 | 30.7 | 28.1 |

The mash sample consisted mainly of intact single cells along with cellular aggregates. Upon homogenization of the mash at pressures between 500 and 3500 psig, the cellular aggregates and intact, single cells were broken up and fractured to form a slurry of cell wall fragments, microparticles and solubilized pectin. The total wet weight of particulates on the 5-tier Tyler sieve screens decreased progressively as the homogenizer pressure increased with the indication that the higher pressures produce finer particles which passed through the sieve system and exited from the 120-mesh sieve.

The sensory analysis of the mash and homogenates indicated that as the homogenizer pressure increased from 500 to 3500 psig, the textural smoothness increased along with a disappearance of graininess in the 2000 and 3500 psig homogenate samples. A drop in the viscous body of the homogenates was noted in the 3500 psig sample. This sensory experience is in accord with the apparent viscosity evaluation of samples presented in Table 2.

TABLE 2

| Sample | Homogenizer Pressure (Psig) | Apparent Viscosity (CP @ 2° C.) |
| --- | --- | --- |
| Mash | — | 36,500 |
| Homogenate 1 | 500 | 36,500 |
| Homogenate 2 | 2000 | 35,000 |
| Homogenate 3 | 3500 | 17,000 |

In this intention, the mesh is to be homogenized at pressures between 1000 and 5000 psig, preferably 2000 and 3500 psig, in order to fracture the intact, single cells and break up cell aggregates for the production of small particle homogenates with the sensory attributes of smoothness, non-graininess, non-gumminess and moderately rapid mouth clearance. Further, the homogenates possess hydrophilic particles which resist sedimentation, possess surfaces for stabilizing added proteins and are compatible with added fruit puree components.

The inventors have found that when a measured amount of mash (5 to 80% weight, preferably 5 to 50% weight) is intermixed with the homogenate, viscous body, opacity and creaminess can be obtained and can be experienced by sensory analysis. The amount of mash to be added to an homogenate for the formation of an apple base is dependent on the usage as an ingredient. For example, in the preparation of a fruit beverage such as a smoothie, an apple base with around 40 to 50% added mash may be advisable to provide a suitable viscous body, creaminess and opaqueness.

Water-dispersible gums such as pectin and guar gum may be added to the homogenate prior to the addition of mash for the purpose of further increasing the viscosity of the apple base. The levels of added gums should be between 0.3 to 1.5%.

With the specified process and formulation parameters presented in this invention, the following desirable functional and quality attributes of the apple base are attained:
  1. nutrient retention of the whole apple;
  2. creamy, smooth, non-gummy consistency;
  3. non-sedimenting particles;
  4. entrapment of protein particles in the apple base matrix of particulates;
  5. opaque, creamy appearance;
  6. mellow, balanced taste;
  7. mild fruit flavor;
  8. near colorless; and
  9. clingability and adhesiveness to added fruit and vegetable pieces.

The universal fruit base (UFB) has been utilized in the following recipes.

EXAMPLE 1

Preparation of Mango Passion Orange All Fruit Nectar

The nectar is an all-fruit beverage consisting of apple base as the major ingredient along with mango puree and fruit juices.

The first step in the preparation of the nectar was the addition of 850 grams of mango puree to 2000 grams of an apple base (50% homogenate and 50% apple mash) with stirring to form a composite. The composite was diluted with a mixture of 150 grams of passion fruit juice, 500 grams of apple juice and 1500 grams of orange juice to prepare the all-fruit nectar beverage.

The apparent viscosity of the nector was about 850 centipoises at 5° C. as measured by a Brookfield DV-II viscometer with spindle No. 2 and with a spindle speed of 20 rpm.

| Ingredient | Quantity % wt/wt | Range |
| --- | --- | --- |
| UFB | 40% | 35–50 |
| Orange juice bx 11.8 | 30% | 20–30 |
| Mango puree | 17% | 15–20 |
| Passion fruit juice | 3% | 3–5 |
| Apple juice | 10% | 0–15 |

Viscosity @ 5° C. 750 to 950 cps
Brookfield #2 spindle, 20 rpm

EXAMPLE 2

Preparation of Mango Passion Fruit Orange Soy Beverage (contains 4 g protein per 8 oz serving)

The soy-fruit beverage is a nutritious product with about 53% soy milk as a non-diary protein source. The beverage contains about 4 grams of protein per 250-gram serving.

To 2500 grams of soy milk (about 3.2% protein), a solution of 15 grams of citrus pectin in 285 grams of water was added to stabilize the protein under acidic conditions. As the soy milk-protein mixture was being stirred, 1250 grams of an apple base (50% homogenate and 50% mash) was added to produce a soy-apple base composite. A mixture of 600 grams of mango puree, 200 grams of orange juice concentrate (about 65% soluble solids) and 150 grams of passion fruit juice (about 14% soluble solids) was added to the stirred soy-apple base composite to produce the soy-fruit beverage.

The apparent viscosity of the soy-fruit beverage was about 175 centipoises at 5° C. as measured by a Brookfield DV-II viscometer with a spindle No. 2 and with a spindle speed of 20 rpm.

| Ingredient | Quantity % wt/wt | Range |
| --- | --- | --- |
| Water | 6% | |
| UFB | 25% | 20–30 |
| Orange juice cone 65 bx | 4% | 3–5 |
| Mango puree | 12% | 10–20 |

-continued

| Ingredient | Quantity % wt/wt | Range |
|---|---|---|
| Passion fruit juice | 3% | 3–5 |
| Soymilk (8 g protein/serving) | 50% | |

Viscosity @ 5° C. 100 to 250 cps
Brookfield #2 spindle, 20 rpm

EXAMPLE 3

Preparation of Mango Passion Fruit Orange Yogurt Beverage

The yogurt-fruit beverage is a nutritious product with about 30% stirred yogurt as a diary protein source.

To 1750 grams of apple base (50% hogenate and 50% mash), 21 grams of citrus pectin was added to produce a pectin-apple base mixture. As the mixture was being stirred, 1500 grams of stirred yogurt was added to form an apple base-yogurt composite. With constant stirring of the composite, 600 grams of mango puree, 900 grams of orange juice (about 14% soluble solids) and 250 grams of passion fruit juice (about 14% soluble solids) were added to produce the yogurt-fruit beverage.

The apparent viscosity of the yogurt-fruit beverage was about 900 centipoises at 5° C. as measured by a Brookfield DV-II viscometer with a spindle No. 2 and with a spindle speed of 20 rpm.

| Ingredient | Quantity % wt/wt | Range |
|---|---|---|
| UFB | 30% | 35–50 |
| Orange juice | 18% | 15–20 |
| Mango puree | 12% | 10–20 |
| Passion fruit juice | 2% | 2–5 |
| Yogurt | 30% | 30–50 |

Viscosity @ 5° C. 800 to 1000 cps
Brookfield #2 spindle, 20 rpm

EXAMPLE 4

Preparation of Fruit Salsa with Apple Base as the Major

Ingredient for the Foundation Sauce

1. Preparation of the Foundation Sauce

The foundation sauce, as the carrier of the fruit and vegetable pieces, is composed of the apple base to which a gum stabilizer, fruit puree, fruit juice concentrate, lemon juice, vinegar and spices are added. The stabilizer mixture was prepared by mixing 5 grams of guar gum with 140 grams of sugar whereupon it is sifted twice in a sieve with 1 mm openings to ensure uniform distribution of the gum in the sugar. The gum-sugar mixture was added slowly to 2230 grams of apple base (50% homogenate and 50% mash) which was being stirred by a paddle attached to a mechanical mixer. The following ingredients were added to the apple base mix in sequence:

| | grams |
|---|---|
| Mango puree | 210 |
| Orange juice concentrate | 200 |
| White vinegar | 120 |
| Lemon juice | 30 |
| Tabasco sauce | 20 |
| Ascorbic acid | 10 |

2. Addition of Fruit and Vegetable Pieces to the Foundation Sauce

The following fruit and vegetable pieces were intermixed with the foundation sauce to produce the fruit salsa:

| | grams |
|---|---|
| Pineapple chunks | 600 |
| Mango chunks | 435 |
| Cantaloupe chunks | 300 |
| Onion pieces | 280 |
| Red pepper pieces | 100 |
| Green pepper pieces | 100 |

3. Heat Treatment of the Fruit Salsa

The fruit salsa was heated to 95° C. and was hot filled into glass jars. The jars were inverted for 3 minutes to sterilize the caps. The jars were immersed in cold water (about 15° C.) to cool the salsa to around 35° C.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A process for producing a multipurpose, multi-functional apple base which comprises:
   (a) washing and sanitizing apples to inactivate residual microorganisms therein;
   (b) cutting the apples into suitable sized pieces;
   (c) steaming the apple pieces to inactivate enzymes, to gelatinize the protoplasts, to break down the intercellular protopectin and to inactivate microorganisms;
   (d) mascerating and screening the steamed apple pieces to produce a mince and to eliminate unwanted skin and core components;
   (e) comminuting the apple mince to form a mash with predominantly intact single cells;
   (f) separating a portion of the mash of step (e) and homogenizing the portion to fracture intact, single cells for the production of protoplasmic microparticles, solubilized pectin and size-specific cell wall fragments; and
   (g) adding to the fractured cell homogenate of step (f) 5 to 80% weight apple mash from step (e) to produce the multipurpose, multi-functional apple base.

2. A process as claimed in claim 1 wherein the washed and sanitized apple pieces are steamed at a temperature between 100 and 110° C. to gelatinize the protoplasts, to inactivate the enzymes and to solubilize the protopectin in the middle lamellae to water-dispersible pectin.

3. A process as claimed in claim 1 wherein the steamed apple pieces are subjected to impaction in a finisher/pulper to produce an apple mince with cellular aggregates and without core, seed and skin components which are removed as waste.

4. A process as claimed in claim 3 wherein the finisher/pulper has a screen opening of 0.05 to 0.13 inches (1.5 to 3.35 mm).

5. A process as claimed in claim 1 wherein the apple mince is passed through a comminutor with specific screens to produce an apple mash with a predominance of intact single cells by disjoining the aggregated cells upon mechanical impaction.

6. A process as claimed in claim 5 wherein the comminutor has screen openings between 0.033 and 0.093 inches (0.85 and 2.36 mm).

7. A process as claimed in claim 1 wherein the apple mash is subject to homogenization at a pressure between 1000 and 5000 psig to bring about the fracture of the intact, single cells to produce a slurry with protoplasmic microparticles, size-specific cell wall fragments and solubilized pectin.

8. A process as claimed in claim 7 wherein the homogenization pressure is between 2000 and 3500 psig.

9. A process as claimed in claim 1 wherein a measured amount of apple mash (5 to 80% weight) is added to the homogenized slurry to produce creaminess, viscosity increase, opacity and apple stability.

10. A process as claimed in claim 1 wherein gum stabilizers are added to increase the viscosity of the apple base to enhance the stability.

11. A process as claimed in claim 1 wherein stabilizers selected from the group consisting of pectin and guar gum are added to the mash.

12. A process as claimed in claim 1 wherein ascorbic acid is added to the apple base to increase the vitamin C content and to keep polyphenolic compounds in a reduced state.

13. A process as claimed in claim 1 wherein 15 to 50% weight apple mash of step (e) is added to the fractured cell homogenate of step (f).

14. A process for producing a multipurpose, multi-functional apple base which comprises:
 (a) washing and sanitizing apples to inactivate residual microorganisms therein;
 (b) cutting the apples into suitable sized pieces;
 (c) steaming the apple pieces at a temperature between 100 and 110° C. to inactivate enzymes, to gelatinize the protoplasts, to break down the intercellular protopectin and to inactivate microorganisms;
 (d) mascerating and screening the steamed apple pieces to produce a mince and to eliminate unwanted skin and core components;
 (e) comminuting the apple mince in a comminutor which has screen openings between 0.033 and 0.093 inches to form a mash with predominantly intact single cells;
 (f) separating a portion of the mash of step (e) and homogenizing the portion at a pressure between 1,000 and 5,000 psig to fracture intact, single cells for the production of protoplasmic microparticles, solubilized pectin and size-specific cell wall fragments; and
 (g) adding to the fractured cell homogenate of step (f) 15 to 50% weight apple mash from step (e) to produce the multipurpose, multi-functional apple base.

* * * * *